(12) United States Patent
Alekseev et al.

(10) Patent No.: US 11,150,266 B2
(45) Date of Patent: Oct. 19, 2021

(54) SCANNING PROBE NANOTOMOGRAPH COMPRISING AN OPTICAL ANALYSIS MODULE

(71) Applicant: CHASTNOE UCHREZHDENIE "NAZARBAYEV UNIVERSITY RESEARCH AND INNOVATION SYSTEM", Astana (KZ)

(72) Inventors: Alexander Mihaylovich Alekseev, Astana (KZ); Aleksey Dmitrievich Volkov, Astana (KZ); Dmitry Yurjevich Sokolov, Moscow (RU); Anton Evgenievich Efimov, Moscow (RU)

(73) Assignee: NAZARBAYEV UNIVERSITY RESEARCH AND INNOVATION SYSTEM, Astana (KZ)

( * ) Notice: Subject to any disclaimer, the term of this patent is extended or adjusted under 35 U.S.C. 154(b) by 521 days.

(21) Appl. No.: 16/302,153

(22) PCT Filed: May 18, 2017

(86) PCT No.: PCT/KZ2017/000012
§ 371 (c)(1),
(2) Date: Dec. 19, 2018

(87) PCT Pub. No.: WO2017/200365
PCT Pub. Date: Nov. 23, 2017

(65) Prior Publication Data
US 2019/0219608 A1    Jul. 18, 2019

(30) Foreign Application Priority Data
May 18, 2016  (KZ) ................. 2016/0435.1

(51) Int. Cl.
*G01Q 10/04* (2010.01)
*G01Q 30/02* (2010.01)
(Continued)

(52) U.S. Cl.
CPC .......... *G01Q 10/04* (2013.01); *G01Q 30/025* (2013.01); *G01Q 30/10* (2013.01); *G01Q 30/20* (2013.01)

(58) Field of Classification Search
CPC ................. H01J 37/20; H01J 2237/206; H01J 2237/266; H01J 2237/24495; H01J 2237/24578; G01N 1/06; G01Q 10/04
See application file for complete search history.

(56) References Cited

U.S. PATENT DOCUMENTS

2012/0223228 A1    9/2012  Galloway
2017/0350921 A1*  12/2017  Alekseev ............... G01Q 30/20

FOREIGN PATENT DOCUMENTS

EP    2482080    8/2012
RU    2233490    7/2004
(Continued)

OTHER PUBLICATIONS

International Search Report PCT/KZ2017/000012 2 pages.
Written Opinion of the International Searching Authority PCT/KZ2017/000012 4 pages.

*Primary Examiner* — Wyatt A Stoffa
*Assistant Examiner* — Hsien C Tsai
(74) *Attorney, Agent, or Firm* — The Roy Gross Law Firm, LLC; Roy Gross

(57) ABSTRACT

The invention relates to the field of probe measurements of objects after micro- and nano-sectioning. The essence of the invention consists in that in a scanning probe nanotomograph having an optical analysis module and comprising a base, on which a piezo-scanner unit, a probe unit and a punching unit are mounted, a sixth actuator is introduced, (Continued)

which is installed on said base, on which an optical analysis module is fastened, which comprises a lens and an analyser, optically connected to each other; moreover, the sixth actuator facilitates displacement of the optical analysis module along the third axis Z. The invention aims at expanding functional capabilities by means of using the optical analysis module. The technical result of the invention consists in enabling the optical observation and study of objects while same are being sectioned, which expands the functional capabilities of the apparatus.

10 Claims, 3 Drawing Sheets

(51) Int. Cl.
  *G01Q 30/20* (2010.01)
  *G01Q 30/10* (2010.01)

(56) References Cited

FOREIGN PATENT DOCUMENTS

| | | |
|---|---|---|
| RU | 2282257 | 8/2006 |
| RU | 2008130494 | 2/2010 |
| RU | 2389032 C2 * | 5/2010 |
| RU | 2427846 | 8/2011 |
| RU | 2012102492 | 3/2014 |

* cited by examiner

SCANNING PROBE NANOTOMOGRAPH COMPRISING AN OPTICAL ANALYSIS MODULE

RELATED APPLICATIONS

This application is a National Phase of PCT Patent Application No. PCT/KZ2017/000012 having International filing date of May 18, 2017, which claims the benefit of priority of Kazakhstan Application No. 2016/0435.1 filed on May 18, 2016. The contents of the above applications are all incorporated by reference as if fully set forth herein in their entirety.

The invention relates to the field of probe measurements of objects after their micro- and nano-sectioning.

There is a known scanning probe microscope, combined with an object surface modification apparatus comprising a base on which a piezo-scanner unit is mounted, configured to functionally move and having a piezo-scanner, on the longitudinal axis O-O1 located along a first axis X, wherein the object holder is fastened on it, having a measuring surface located in the plane of a second axis Y and a third axis Z. The probe unit having the probe holder is mounted onto the piezo-scanner unit, configured to functionally move along the first axis X and configured to interact with the measuring object surface. A punching unit comprising a punch having a cutting edge is also mounted on a two-axis actuator of the punch, the cutting edge being located along the second axis Y and configured to interact with the object. The piezo-scanner is configured to displace the object holder having the object along the first axis X, along the second axis Y, along the third axis Z and provides for scanning of the object in the plane of the second axis Y and the third axis Z, as well as its displacement along the first axis X [EP 2482080 A1]. In one embodiment, a scanning probe microscope combined with an apparatus of the object surface modification and scanning can be equipped with a cryochamber. The main disadvantage of this apparatus is that it lacks means for observation of the object surface at the time of its sectioning.

Also known is a scanning probe microscope having an optical unit comprising a base on which a piezo-scanner unit is mounted, on which a piezo-scanner is fastened, comprising an object holder comprising an object having a measured surface, the piezo-scanner facilitating displacement of the object holder having the object along the first axis X, along the second axis Y, and the third axis Z, the second axis Y and the third axis Z forming an object scanning plane relative to the probe, and the first axis X being perpendicular to the object scanning plane, the piezo-scanner unit comprising a first actuator facilitating its displacement together with the piezo-scanner, the object holder and the object along the third axis Z; on a base, a probe unit is also mounted together with a probe holder, in which the probe is fastened, configured to interact with the measured surface of the object, the probe unit comprising a second actuator facilitating displacement of the probe holder together with the probe along the first axis X, and comprising a third actuator facilitating displacement of the probe holder together with the probe along the second axis Y; on the base also a punching unit is mounted, comprising a punch having a cutting edge, the punching unit comprising a fourth actuator facilitating its displacement along the first axis X, and a fifth actuator facilitating its displacement along the second axis Y, and the cutting edge being located along the second axes Y and being configured to interact with the object; on the base, an optical unit is also mounted, optically connected to the object holder, the measured surface of the object and the probe and having an optical axis O-O1 located along the first axis X, the probe unit being located between the object holder having the object and the optical unit [RU2389032]. This apparatus is selected as a prior art for the proposed solution.

The disadvantage of this apparatus is that the apparatus does not allow to observe the object at the time of its sectioning and optical study thereof.

The invention aims at expanding functional capabilities by means of using an optical analysis module.

The technical result of the invention constitutes enabling of the observation of the object while same is being sectioned. The dynamic picture of sectioning provides the most objective picture of the nature of the measured surface of the object. This allows to optimally select areas of probe studies and increase their resolution. An additional technical result is an enabling of the optical studies of the sectioned surface of the object and the object fragments remaining on the punch surface. This expands the functional capabilities of the apparatus.

Said technical results are achieved due to the fact that in the scanning probe nanotomograph having an optical analysis module and comprising a base on which a piezo-scanner unit is mounted, on which a piezo-scanner is fastened, comprising an object holder comprising an object having a measured surface, wherein the piezo-scanner facilitates displacement of the object holder together with the object along the first axis X, the second axis Y, and the third axis Z, the second axis Y and the third axis Z forming the object scanning plane relative to the probe and the first X axis being perpendicular to the object scanning plane, wherein the piezo-scanner unit comprises a first actuator facilitating its displacement together with the piezo-scanner, the object holder and the object along the third axis Z; on a base, a probe unit is also mounted, having a probe holder, in which a probe is fastened and configured to interact with the measured surface of the object, wherein the probe unit comprises a second actuator facilitating displacement of the probe holder together with the probe along the first axis X, and comprises a third actuator facilitating its displacement of the probe holder together with the probe along the second axis Y, on the base. a punching unit is also mounted, comprising a punch having a cutting edge, wherein the punching unit comprises a fourth actuator facilitating its displacement along the first axis X and the fifth actuator facilitating its displacement along the second axis Y, and the cutting edge is located along the second axis Y and is configured to interact with the object; on the base, an optical unit is also mounted, optically connected to the object holder, the measured surface of the object, the probe and having an optical axis O-O1 located along the first axis X, wherein the probe unit is located between the object holder with the object and the optical unit, the optical unit being configured as an optical analysis module comprising a lens and an analyzer, optically connected to each other; a sixth actuator mounted on the base, on which the optical analysis module is fastened, is introduced into the scanning probe nanotomograph having the optical analysis module, the sixth actuator facilitating displacement of the optical analysis module along the third axis Z.

In one embodiment, the sixth actuator is configured to displace the optical analysis module along the third axis Z synchronously with the displacement of the piezo-scanner together with the object holder, the object, the first actuator along the third axis Z.

In one embodiment, the seventh actuator is introduced into the apparatus, facilitating displacement of the lens along the first axis X.

In one embodiment, the adjustment module is introduced into the apparatus along the second axis Y, fastened on the piezo-scanner unit, the piezo-scanner being fastened on the adjustment module along the second axis Y.

In one embodiment, the adjustment module along the second axis Y is configured as a first flange mated with the second flange by means of a conical movable stop and a ball bearing mounted on the first flange.

In one embodiment, the adjustment module is introduced into the apparatus along the first axis X, fastened on the sixth actuator, the optical analysis module being fastened on the adjustment module along the first axis X.

In one embodiment, the adjustment module along the first axis X is configured as a third flange mated with the fourth flange by means of a first eccentric and a second eccentric mounted on the third flange.

In one embodiment, the analyzer is configured as a CCD matrix.

In one embodiment, the analyzer is configured as a spectrometer.

Figure 1:
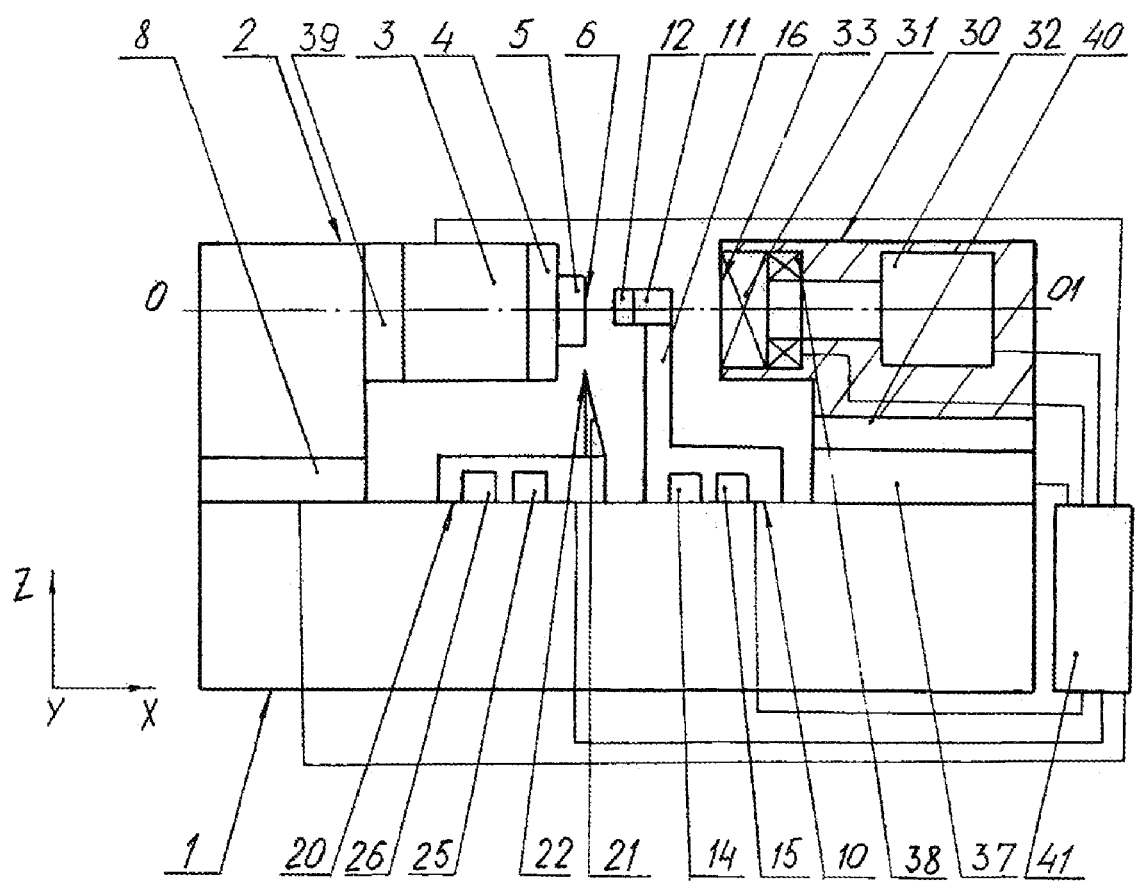
FIG. 1 shows the layout diagram of the scanning probe nanotomograph having the optical analysis module.

A scanning probe nanotomograph having an optical analysis module comprises a base 1, on which a piezo-scanner unit 2 is mounted. On the piezo-scanner unit 2, a piezo-scanner 3 is fastened, comprising an object holder 4 comprising an object 5 having a measured surface 6. The piezo-scanner 3 facilitates displacement of the object holder 4 together with the object 5 along a first axis X, along a second axis Y, and along a third axis Z. The second axis Y and the third axis Z form a scanning plane of the object 5. The first axis X is perpendicular to the scanning plane of the object 5. The piezo-scanner unit 2 comprises a first actuator 8 facilitating its displacement together with the piezo-scanner 3, the object holder 4 and the object 5 along the third axis Z. As the first actuator 8, for example, lever actuators of [1, 2] or a linear single-axis piezo-actuator ANPz101 produced by the Attocube company, having a displacement range of more than 5 mm, as well as a linear actuator M-451 produced by the Physik Instrumente company can be used. On a base 1, a probe unit 10 is also mounted, having a probe holder 11, in which a probe 12 is fastened, configured to interact with the measured surface 6 of the object 5. As the probe 12, either a probe of a tunneling microscope or a quartz resonator comprising a needle can be used. The probe unit 10 comprises a second actuator 14, facilitating displacement of the probe holder 11 with a probe 12 along the first axis X, and comprises a third actuator 15, facilitating displacement of the probe holder 11 with the probe 12 along the second axis Y. As the second actuator 14 and the third actuator 15, actuators with pushers, as well as linear piezo-actuators ANPz101 produced by the Attocube company can be used. On the base 1, a punching unit 20 is also mounted, comprising a punch 21 having a cutting edge 22. The punching unit 20 comprises a fourth actuator 25 facilitating its displacement along the first axis X and a fifth actuator 26 facilitating its displacement along the second axis Y. The cutting edge 22 is located along the second axis Y and is configured to interact with the object 4. The fourth actuator 25 and the fifth actuator 26 are standard components of the cryotomes and microtomes of the Leica company. On the base 1, an optical analysis module 30 is also mounted, optically connected to the object holder 4 and the measured surface 6 of the object 5 and having the measured an optical axis O-O1 located along the first axis X. The optical analysis module 30 comprises a lens 31 and an analyzer 32 optically mated with each other. As the lens 31, it is advisable to use, for example, a 100× Mitutoyo Plan Apo lens having a working length of 11 mm. Probe unit 10 is located between the object holder 4 with the object 5 and the optical analysis module 30. The sixth actuator 37 mounted on the base 1, on which the optical analysis module 30 is fastened, is introduced into the scanning probe nanotomograph with the optical analysis module. A linear actuator M-451 produced by the Physik Instrumente company can be used as sixth actuator 37, which facilitates displacement of the optical analysis module 30 along the third axis Z.

In one embodiment, the sixth actuator 37 is configured to displace the optical analysis module 30 along the third axis Z synchronously with the displacement of the piezo-scanner 3 together with the object holder 4 and the object 5 by first actuator 8 along the third axis Z. In this case, it is advisable to use as first actuator 8 and sixth actuator 37 the same actuators, for example, M-451 produced by Physik Instrumente company.

In one embodiment, a seventh actuator 38 facilitating displacement of the lens 31 along the first axis X is introduced into the scanning probe nanotomograph with the optical analysis module. As the seventh actuator 38, either linear piezo actuators of ANPz101 type produced by the Attocube company or annular piezoactuators of P-025, P-080 types produced by the Physik Instrumente company can be used.

In one embodiment, an adjustment module is introduced into the scanning probe nanotomograph with the optical analysis module along the second axis Y 39, fastened on the piezo-scanner unit 2, wherein the piezo-scanner 3 is fastened on the adjustment module along the second axis Y 39. Fastening the adjustment module along the second axis Y 39 on the piezo-scanner unit 2 can be implemented by means of mounting screws (not shown).

Figure 2:
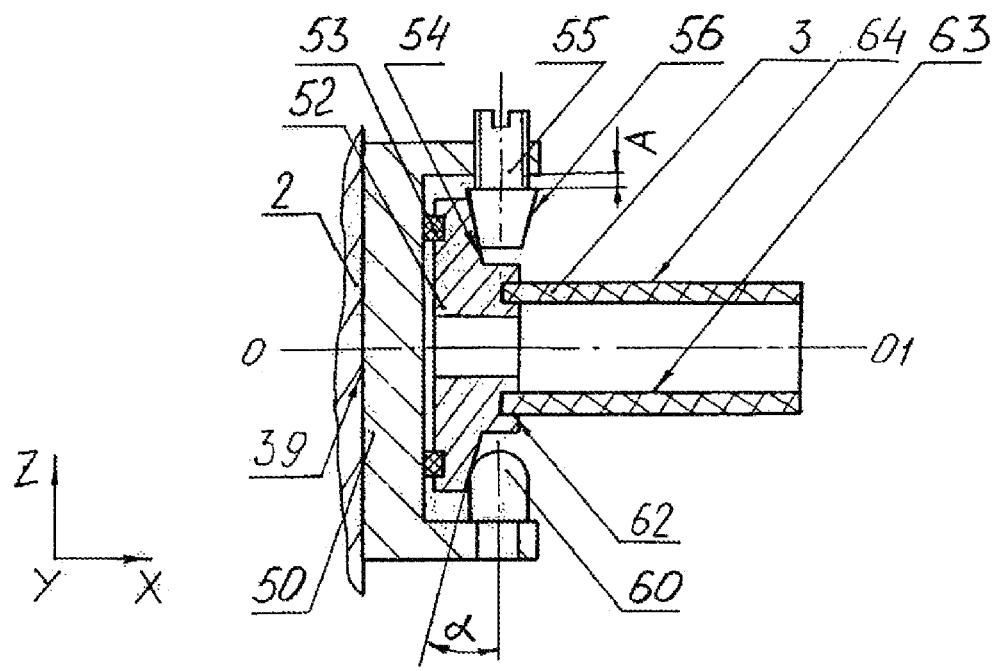
FIG. 2 shows an embodiment of the adjustment module along the second axis Y.

In one embodiment, the adjustment module along the second axis Y 39 is configured as a first flange 50 (FIG. 2) mated with a second flange 52 through supports 53 by means of a conical movable stop 55 and a ball bearing 60 mounted on the first flange 50. It is advisable to make the first flange 50 of 40Cr13 steel, the second flange 52 of titanium, inserts 53 and the ball bearing 60 of bronze, a movable stop 55 of 12Cr18Ni10T steel. On the tapered surface 56 of the movable stop 55, micro-cuts 5-50 microns high may be formed located along the longitudinal axis of the movable stop 55. The movable stop 55 may comprise an M4 thread having a pitch of 0.5 mm. The value A may be in the range of 4-6 mm. Angle α can be in the range of 5-15 degrees. The piezo-scanner 3 on the second flange 52 can be fastened with glue, for example, epoxy resin, or mounted by a tight fit in the groove 62 with the inner surface 63 and the outer surface 64. In this case, the second flange 52 should be made of titanium having an expansion coefficient close to the expansion coefficient of the piezo-scanner 3 piezoceramics.

In one embodiment, the adjustment module is introduced into the scanning probe nanotomograph having the optical analysis module along the first axis X 40 (FIG. 1), fastened on the sixth actuator 37, wherein the optical analysis module 30 is fastened on the adjustment module along the first axis X 40. Fastening of the adjustment module along the first axis X 40 on the sixth actuator 37 can be carried out using mounting screws (not shown). Fastening of the optical analysis module 30 on the adjustment module along the first axis X 40 can be carried out using mounting screws (not shown).

Figure 3:
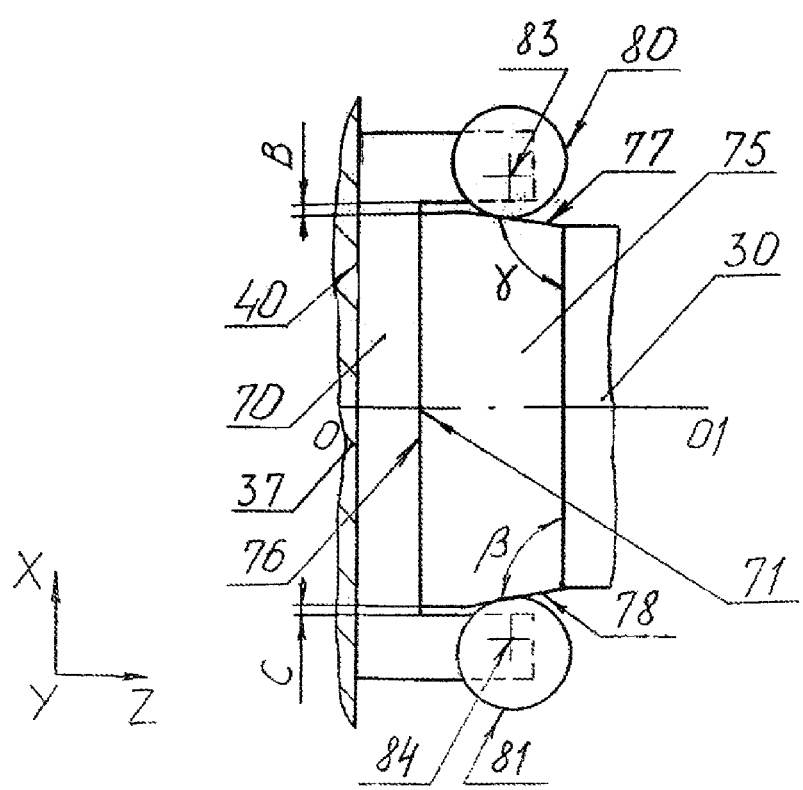
FIG. 3 shows an embodiment of the adjustment module along the first axis X.

In one embodiment, the adjustment module along the first axis X 40 (FIG. 3) is configured as a third flange 70 having a first surface 71 mated with a fourth flange 75 having a second surface 76 using a first eccentric 80 and a second eccentric 81 mounted on the third flange 70. The height of the micro asperities of the first surface 71 of the third flange 70 and the second surface 76 of the fourth flange 75 should not exceed 1 µm. As a material of the first eccentric 80 and the second eccentric 81 titanium can be used. The height of the micro asperities of a first tapered surface 77 and a second tapered surface 78 of the fourth flange 75 may be in the range of 1-10 µm. Angles 13 and y can be in the range of 3-7 degrees.

In one embodiment, the analyzer 32 (FIG. 1) is configured as a CCD matrix, for example, of the Clara type produced by ANDOR company.

In one embodiment, the analyzer 32 is configured as a spectrometer, for example, of the Shamrock 750 type produced by ANDOR company.

Figure 4:
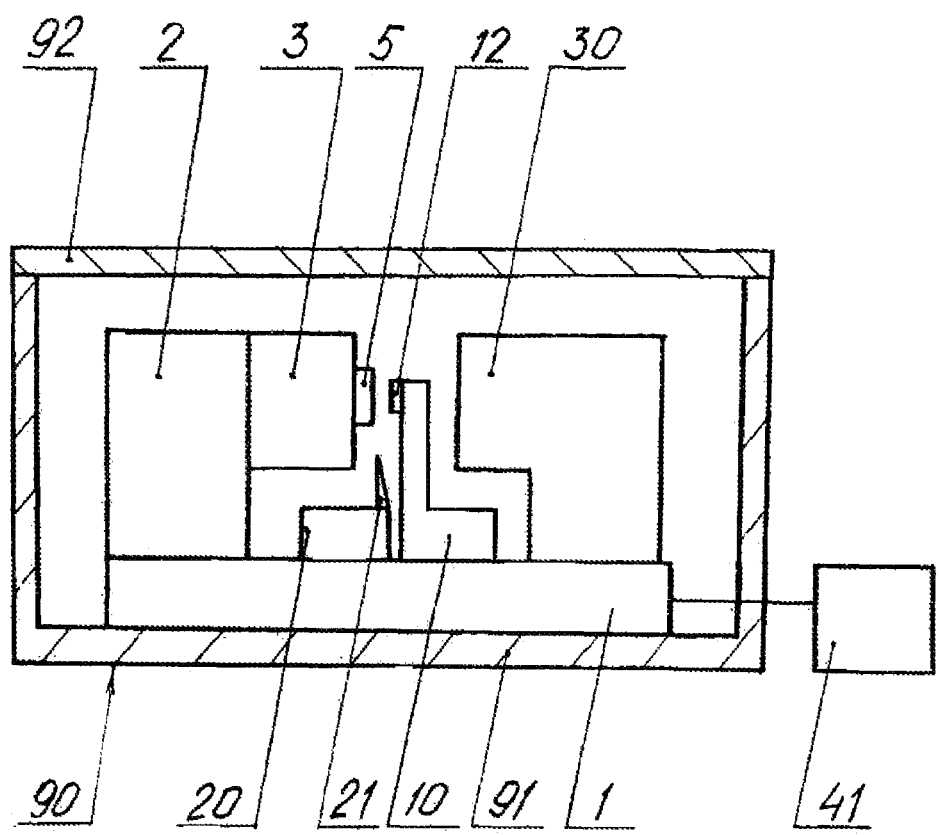
FIG. 4 shows an embodiment in which the apparatus is located within a cryogenic chamber.

In one embodiment, the apparatus is equipped with a cryochamber 90 (FIG. 4) comprising a housing 91 and a cover 92, wherein the base 1 having the elements located thereon, is disposed in the cryochamber 90.

The scanning probe nano tomograph comprising the optical analysis module operates as follows. The object 5 having a measured surface 6 is mounted on the piezo-scanner 3, i.e., on the object holder 4. The probe 12 is fastened to interact with the measured surface 6 of the object 5 in the probe unit 10, i.e., in the holder of the probe 11. In the punching unit 20, a punch 21 is fastened having a cutting edge 22. In this case, the cutting edge 22 should be located along the second axis Y and configured to interact with the object 4. The optical analysis module 30 should be optically connected to the measured surface 6 of the object 5. The first actuator 8 facilitates displacement of the piezo holder 3 together with the object 4 and the object 5 along the third axis Z, and its sectioning with the punch 21.

The sixth actuator 37 facilitates displacement of the optical analysis module 30 along the third axis Z synchronously with the displacement of the piezo-scanner 3 together with the object holder 4 and the object 5 by the first actuator 8. In this case, the measured surface 6 of the object 5 is monitored.

The seventh actuator 38 facilitates displacement of the lens 31 along the first axis X and allows to quickly adjust focusing on the measured surface 6 of the object 5.

The punching unit 20 facilitates displacement along the first axis X by means of the fourth actuator 25 and facilitates displacement along the second axis Y by means of the fifth actuator 26. In this case, the section thickness along the first axis X and the section zone along the second axis Y are selected. It is also possible to remove the punch 21 from a mounting zone of the probe 12 using the fifth actuator 26 while it is fastened in the probe holder 11.

The probe unit 10 facilitates displacement of the probe holder 11 together with the probe 12, by means of the second actuator 14, along the first axis X to the object 5 for its subsequent study. The third actuator 15 facilitates displacement of the probe holder 11 together with the probe 12 along the second axis Y to select the study area on the measured surface 6 of the object 5.

Piezo-scanner 3 facilitates displacement of the object holder 4 together with object 5 along the first axis X, along the second axis Y and along the third axis Z. The second axis Y and the third axis Z form a scanning plane of the object 4 relative to the probe 12 during the study of the measured surface 6.

The adjustment module along the second axis Y 39 performs adjusting displacement of the piezo-scanner 32 together with the object 5 into the selected study area by means of the optical analysis module 30.

At the time of clamping the second flange 52 on the first flange 50, a shift of the second flange 52 can occur in the range of 1 mm along the axis Y while maintaining the reliability of fixation of the second flange 52.

The adjustment module along the first axis X 40 performs adjusting displacement of the optical analysis module 30 along the first axis X.

Rotating the first eccentric 80 and second eccentric 81, respectively, around the axes 83 and 84, the plane 76 of the fourth flange 75 can be forced against the surface 71 of the third flange 70 and the fourth flange 75 can be displaced along the first axis X.

The analyzer 32 configured as a CCD matrix allows to observe the measured surface 6 of the object 5, both during the sectioning process and thereafter. It also allows to observe the fragments of the sectioned object on the punch and the quality of cutting edge 22 thereof.

The analyzer 32 configured as a spectrometer allows to measure local spectral information on the measured surface 6 of the object 5, both during the sectioning process and thereafter, as well as on the fragments of the sectioned object on the punch 21.

What makes it possible to observe the object 5 during sectioning thereof is the fact that in the scanning probe nanotomograph comprising the optical analysis module, the optical unit 30 is configured as the optical analysis module 30 comprising the optical lens 31 and the analyzer 32 optically connected to each other; wherein the sixth actuator 37 mounted on the base 1, is introduced into the scanning probe nanotomograph comprising the optical analysis module on which the optical analysis module 30 is fastened, wherein the sixth actuator 37 facilitates displacement of the optical analysis module 30 along the third axis Z. The dynamic picture of the section provides the most objective picture of the nature of the measured surface 6 of the object 5. This allows to optimally select areas of probe studies on the measured surface 6 and increase their resolution. An additional technical result is the possibility of optical studies of the sectioned surface of the object 5 and fragments of the object 5 remaining on the surface of the punch 21. This expands the functional capabilities of the apparatus.

The fact that the sixth actuator 37 is configured to move the optical analysis module 30 along the third axis Z synchronously with the displacement of the piezo-scanner 3 with the object holder 4 and the object 5 by the first actuator 8, improves the accuracy of the optical observation of the object 5 during sectioning thereof. With more accuracy, this allows to optimally select areas of probe study and increase their resolution.

The fact that the seventh actuator 38 is introduced into the scanning probe nanotomograph comprising the optical analysis module, facilitating displacement of the lens 31 along the first axis X, allows, in the course of consecutive sections of the object 5, to focus the lens 31 to the depth of 80 µm in the automatic mode using the annular piezo-actuator P-080 and to the depth of more than 1 mm using the piezoactuator ANPz 101. This increases the accuracy of optical observations and studies of the object 5 (measuring surface 6).

The fact that the adjustment module is introduced into the scanning probe nanotomograph comprising the optical analysis module along the second axis Y 39, fastened on the piezo-scanner unit 2, wherein the piezo-scanner 3 is fastened on the adjustment module along the second axis Y 39, which allows accurate (+/−0.1 mm) preset of the object 5 relative to the optical axis O-O1. This improves the accuracy of optical observations and studies of the object 5 (measuring surface 6).

The fact that the adjustment module along the second axis Y 39 is configured as the first flange 50 mated with the second flange 52 by means of the conical movable stop 55 and the ball bearing 60 mounted on the first flange 50, in addition to presetting the object 5 relative to the optical axis O-O1, makes the piezo-scanner 3 quick-detachable. This allows to fasten the object 5 on the object holder 4 outside the apparatus configuration shown in FIG. 1. This simplifies the operation of the apparatus, eliminates unauthorized contact of the object 5 with the probe 12, improves the safety of the probe 12 and, accordingly, the resolution of probe measurements of the object 5 (measured surface 6). Pressing up the second flange 52 against the first flange 50 using the movable stop 55 having the taper surface 56 provides for maximum sampling of backlashes of the movable connection of the second flange 52 and the first flange 50, reduces non-functional displacements of the piezo-scanner 3, and increases the resolution of the probe measurements of the object 5 (measured surface 6).

The fact that the adjustment module is introduced into the scanning probe nanotomograph having the optical analysis module along the first axis X 40, fastened on the sixth actuator 37, wherein the optical analysis module 30 is fastened on the adjustment module along the first axis X 40, allows to retract the optical analysis module 30 from the object 5 (from the probe holder 11 having the probe 12) to replace the probe 12. Given that the focal distance of the lens 31 is in the range of 5 to 11 mm, and dimensions of the probe 12 having the probe holder 11 along the axis X are at least 3 mm, this retraction simplifies replacement of the probe 12, increases the safety thereof and, accordingly, the resolution of probe measurements of the object 5 (measured surface 6), and simplifies the operation of the apparatus.

The fact that the adjustment module along the first axis X 40 is configured as the third flange 70 mated with the fourth flange 75 by means of the first eccentric 80 and the second eccentric 81 mounted on the third flange 70, provides for accurate backlash-free retraction and advancement of the optical analysis module 30 from/to the probe holder 11 together with the probe 12. This eliminates the unauthorized touching of the optical analysis module 30 on the probe holder 11, eliminates the unauthorized touching of the probe 12 on the object 5, increases the safety of the probe 12 and, accordingly, the resolution of probe measurements of the object 5 (measured surface 6). Using the first eccentric 80 and the second eccentric 81 also enables quickly removing the optical analysis module 30 from the base 1. This further simplifies the replacement of the probe 12 due to increase of the area for manipulating thereof. Pressing the fourth flange 75 against the third flange 70 using the first eccentric 80 and the second eccentric 81 provides for maximum sampling of backlashes of the movable connection of the fourth flange 75 and the third flange 70, reduces non-functional displacements of the optical analysis module 30, and improves the accuracy of optical observations and optical studies of the object 5 (measured surface 6).

The fact that the analyzer 32 is configured as a CCD matrix allows to observe the quality of the cutting edge 22 of the punch 21. The quality of the cutting edge 22 affects the quality of the measured surface 6. The timely replacement of the punch 21 provides for the high quality of the measured surface 6 and the high resolution of probe measurements of the object 5 (measured surface 6).

The fact that analyzer 32 is configured a spectrometer makes it possible to study, by analyzing the obtained spectral information, the local chemical composition of the measured surface 6 of object 5, both during the sectioning process and thereafter, and the local chemical composition of fragments of the sectioned object on the punch 21. This expands the functional capabilities of the apparatus.

We claim:

1. A scanning probe nanotomograph having an optical analysis module comprising a base, on which a piezo-scanner unit is mounted, on which a piezo-scanner is fastened, comprising an object holder comprising an object having a measured surface, wherein the piezo-scanner facilitates displacement of the object holder along with the object along a first axis X, along a second axis Y, and along a third axis Z, the second axis Y and the third axis Z form an object scanning plane relative to a probe, and the first X axis is perpendicular to the object scanning plane, wherein the piezo-scanner unit comprises a first actuator facilitating its displacement along with the piezo-scanner, the object holder and the object along the third axis Z, on a base, a probe unit is also mounted, having a probe holder, in which the probe is fastened, configured to interact with the measured surface of the object, wherein the probe unit comprises a second actuator facilitating displacement of the probe holder along with the probe along the first axis X, and comprises a third actuator facilitating displacement of the probe holder along with the probe along the second axis Y; on the base, a punching unit is also mounted, comprising a punch having a cutting edge, wherein the punching unit comprises a fourth actuator facilitating its displacement along the first axis X, and a fifth actuator facilitating its displacement along the second axis Y, and the cutting edge is located along the second axis Y and is configured to interact with the object; on the base, an optical unit is also mounted, optically mated with the object holder, the measured surface of the object, and having an optical axis located along the first axis X, wherein the probe unit is located between the object holder along with the object and the optical unit wherein the optical unit is configured as an optical analysis module comprising a lens and an analyzer optically connected to each other; a sixth actuator mounted on the base, on which the optical analysis module is fastened, is introduced into the scanning probe nanotomograph having an optical analysis module, the sixth actuator facilitating displacement of the optical analysis module along the third axis Z.

2. An apparatus of claim 1, wherein the sixth actuator is configured to displace the optical analysis module along the third axis Z synchronously with the displacement of the piezo-scanner together with the object holder and the object by the first actuator along the third axis Z.

3. The apparatus of claim 1, wherein the seventh actuator is introduced therein, facilitating displacement of the lens along the first axis X.

4. The apparatus of claim 1, wherein an adjustment module is introduced along the second axis Y, fastened on the piezo-scanner unit, the piezo-scanner being fastened on the adjustment module along the second axis Y.

5. The apparatus of claim 4, wherein an adjustment module along the second axis Y is configured as a first flange mated with a second flange by means of a conical movable stop and a ball bearing mounted on the first flange.

6. The apparatus of claim 1, wherein an adjustment module is introduced along the first axis X, fastened on the sixth actuator, the optical analysis module being fastened on the adjustment module along the first axis X.

7. Apparatus of claim 6, wherein an adjustment module along the first axis X is configured as a third flange mated with a fourth flange by means of a first eccentric and a second eccentric mounted on the third flange.

8. The apparatus of claim 1, wherein the analyzer is configured as a CCD matrix.

9. The apparatus of claim 1, wherein the analyzer is configured as a spectrometer.

10. The apparatus of claim 1, wherein said apparatus is equipped with a cryochamber, the base together with the elements located thereon being located within the cryochamber.

* * * * *